Sept. 25, 1951

W. J. ZENNER 2,569,364

TAPE FEEDING AND STORAGE DEVICE

Filed Oct. 17, 1947

INVENTOR
WALTER J. ZENNER
BY Emery Robinson
ATTORNEY

Patented Sept. 25, 1951 2,569,364

UNITED STATES PATENT OFFICE 2,569,364

TAPE FEEDING AND STORAGE DEVICE

Walter J. Zenner, Des Plaines, Ill., assignor to Teletype Corporation, Chicago, Ill., a corporation of Delaware Application October 17, 1947, Serial No. 780,424

5 Claims. (Cl. 271—2.1)

This invention relates to web feeding and storing apparatus, and more particularly to a tape feeding and storage means for use with telegraph apparatus.

In printing telegraph systems having a central station and a number of outlying branch stations it has been found desirable to provide a switching center to control the circuits between the stations. Incoming messages are received at the switching center on a perforator which records them on a tape in the form of perforations therein. The circuit over which these messages are to be retransmitted is often crowded for long periods of time during which more messages to be retransmitted over this same circuit continue to come in. Therefore, the tape on which these incoming messages are recorded becomes of considerable length and there is presented the problem of storing this tape until it can be run through the transmitter.

It is necessary to preserve this perforated tape in untwisted and undamaged form until the message can be retransmitted. Early attempts to alleviate this problem of handling the tape usually involved the use of a box-like storage bin into which the perforated tape was allowed to fall. However, this proved to be an inadequate solution to the problem because successive folds of tape became twisted and tangled with one another within such a box. More recently bins have been used wherein the width thereof has been only slightly greater than the transverse width of the tape to be stored therein. This particular type of storage bin tends to eliminate the twisting and tangling of the tape after the tape is once therein. Another problem is encountered because of the static electricity on the tape which causes the tape to adhere to the bin entrance and to the tape feeding mechanism. When the tape is entering and being withdrawn from the bin at the same time, the tape may be in the form of a loop within the feeding mechanism in the bin or it may have accumulated within the bin to such an extent that there will be two strands of tape within the feeding mechanism.

Accordingly, it is an object of this invention to provide a tape feeding apparatus that will function properly under the above conditions.

The tape storage bins heretofore in general use have been placed immediately beneath the telegraph apparatus and often interfere with the operator. Therefore, another object of this invention is to provide an offset tape storage bin, the width of which is to be determined by the transverse width of the tape to be stored therein, wherein the offset tape storage bin is so positioned with reference to a perforator transmitter that an operator at the apparatus will not be cramped by the bin.

Still another object of this invention is to provide an intermittent tape feeding means for feeding a tape into a storage bin.

A further object of this invention is to provide means for positively preventing a tape from adhering to a circularly moving friction type tape advancing means during the reverse movement of the tape advancing means.

Other objects and advantages will be apparent and the invention will be understood more readily by referring to the following description when read in conjunction with the drawing, in which.

Figure 1:
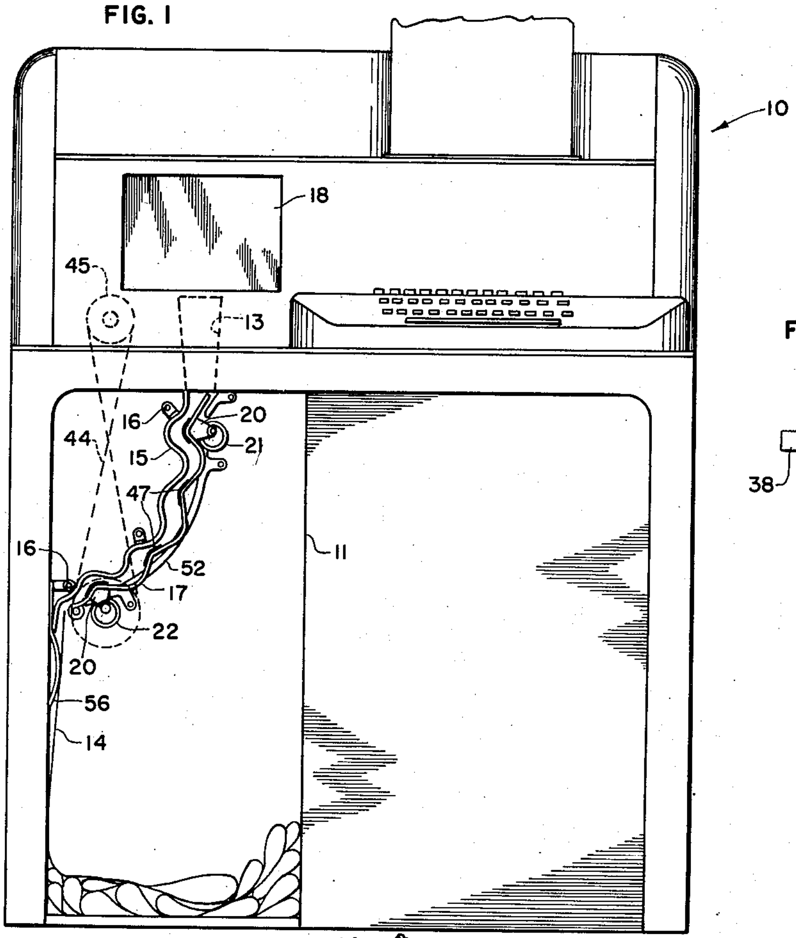
Fig. 1 is a front elevational view of a telegraph perforator transmitter in combination with a tape storage bin and tape feed therefor designed in accordance with the principles of the invention.

In the drawing, a perforator transmitter indicated generally by the numeral 10 is equipped with a perforator and a transmitter or tape sensing unit which is positioned behind a removable transparent viewing panel 18 to provide access to the perforator and tape sensing unit. An offset tape storage bin 11 is positioned at one side of and below the perforator transmitter so as not to interfere with the operator at the apparatus. The tape storage bin 11 is only slightly wider than the transverse width of the tape to be stored therein, so that each succeeding fold of tape in the bin will lie neatly on the preceding fold and there will be no tendency for the pile of tape to slip downwards laterally and become entwined, twisted, or tangled. As viewed in Fig. 1, the tape storage bin 11 is provided with a front cover (not shown) which may be fastened to the bin by any well known means, such as by bolts or hinges. The front cover in its preferred form is removable and is provided with a transparent viewing plate (not shown). The tape storage bin 11 is provided with a back plate 12 which is fastened to the machine 10. A portion of the back plate 12 extends above the top of storage bin 11 to form the back of a slot 13 through which the tape passes after being perforated.

A stationary corrugated guide member 15 is mounted in the storage bin 11 and held in place by bolts 16. A complementary tape advancing member in the form of a movable corrugated guide member 17 is positioned in the storage bin 11 in spaced cooperation with the stationary corrugated guide member 15, and is held by brackets 20 which are mounted pivotally on eccentrics 21 and 22, by means of bolts 23 and 24. Rotation of the eccentrics 21 and 22 imparts circular motion to the movable corrugated guide member 17, whereby this corrugated guide member is alternately brought to its position shown in Fig. 2 and that position represented by the dotted line 29.

Figure 3:
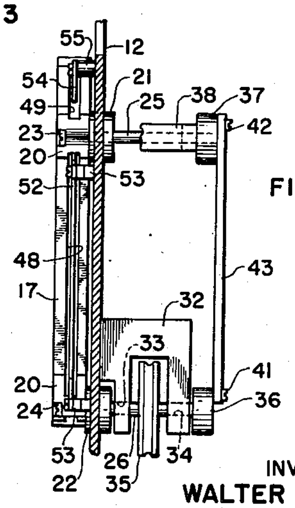
Fig. 3 is a detailed sectional view taken approximately on line 3—3 of Fig. 2.

As shown in Fig. 3, eccentric 21 is fixed on shaft 25 and eccentric 22 is secured to shaft 26. The shaft 25 is journalled in a bracket 38 which is stationarily mounted on the back plate 12 of the bin 11. Mounted on the back plate 12 is a yoke 32 having apertures 33 and 34 in which the shaft 26 is mounted rotatably. A pulley 35 is splined to the shaft 26 between the arms of the yoke 32 and also an eccentric 36 is secured to the shaft 26, outside of the yoke 32.

An eccentric 37 is keyed to shaft 25, and the bracket 38 surrounding shaft 25 between eccentric 37 and collar 27 prevents longitudinal displacement of shaft 25.

Figure 4:
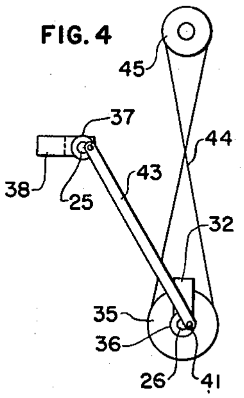
Fig. 4 is a detailed view of a portion of the driving mechanism.

Eccentrics 36 and 37 are linked together by a connecting rod 43, which is fastened pivotally thereto by bolts 41 and 42. Relative to the shafts 26 and 25 respectively, the bolts 41 and 42 are offset 90 degrees from bolts 24 and 23, and consequently, when shaft 26 is rotated, a corresponding uniform rotation of shaft 25 will be obtained due to the linkage between eccentric 36, connecting rod 43, and eccentric 37, and the linkage between eccentric 22, guide member 17, and eccentric 21. Shaft 26 is rotated by a driving belt 44, Fig. 4, which connects pulley 35 to a continuously rotating power pulley 45.

In the embodiment of the invention illustrated herein the power pulley 45 obviously is to be considered as fastened to any convenient continuously rotating shaft.

Figure 2:
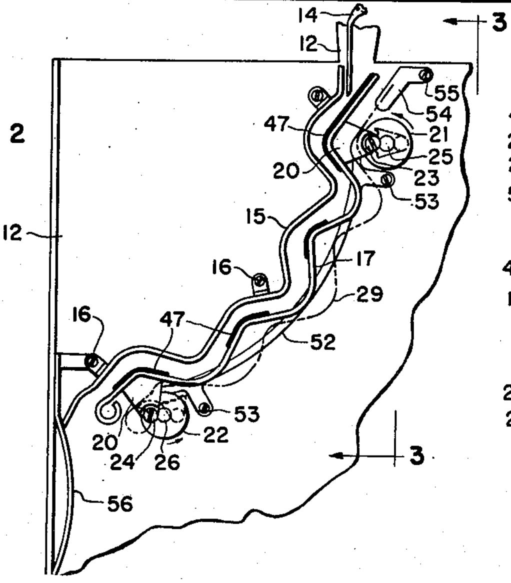
Fig. 2 is an enlarged front elevational view of the tape feeding mechanism.

Referring now to Fig. 2, rotation of shafts 25 and 26 is in a counterclockwise direction so that eccentrics 21 and 22 will impart forward or feeding motion to the movable corrugated guide member 17 during that portion of movement thereof that the two corrugated guide members 17 and 15 are closest together. Rubber pads 47 are applied to the high portions of movable corrugated guide member 17 to frictionally engage the tape 14 and positively advance it downwardly and towards the side of the tape storage bin 11, during the feeding motion of the movable corrugated guide member 17.

Referring to Fig. 3, the movable corrugated guide member 17 is provided with longitudinal slots 48 and 49 therein. A fixed strip 52 and a fixed member 54 are secured within the tape storage bin 11 by machine screws 53 and 55 and protrude through the longitudinal slots 48 and 49, respectively, during the backward movement of the movable corrugated guide member 17, as illustrated by the dotted line position 29 thereof, and thus prevent the tape 14 from adhering to the rubber pads 47 during such backward movement of the movable corrugated guide member 17.

A guide 56 is secured to the inside of the tape storage bin 11 adjacent the lower extremity of the stationary corrugated guide member 15 and is bowed inwardly to prevent the tape from being forced down along the side of the tape storage bin 11.

Having thus described the construction of the invention, a brief description of the path of travel of the tape is deemed helpful for a more complete understanding of the invention.

After the tape 14 is perforated it passes into the slot 13, which is the entrance to tape storage bin 11, and thence between the two corrugated guide members 15 and 17, where it is advanced therethrough in a step-by-step movement due to the circular motion of the movable corrugated guide member 17. The flat sides of the tape 14 are in contact with one or more of the high portions of the two corrugated guide members 15 and 17 during the advancement of the tape therebetween and therefore there is no substantial twisting of the tape. During the feed motion of the movable corrugated guide member 17, the tape 14 is frictionally engaged and forced towards the stationary corrugated guide member and downwardly into the bin. If the tape is in the form of a loop between the corrugated guide members, it will be advanced into the bin during the feeding movement of the movable corrugated guide member 17, and the fixed strip 52 will prevent the recession of the tape during the backward movement of the movable guide member. When there are two strands of tape between the guide members 15 and 17, the tape being fed into the bin will be frictionally engaged and slipped over that being withdrawn from the bin. Upon emerging from between the two corrugated guide members, the tape 14 strikes the guide 56 which deflects it from the side of the storage bin, after which it then falls to the bottom of the storage bin in the form of successive loops of tape which fold one over the other in an orderly arrangement, such as illustrated in Fig. 1.

It should be pointed out that in the particular embodiment of the invention shown and described, the corrugated guide members are curved. This of course, is advantageous in that such curvature causes the tape to be directed away from the perforator discharge into the storage bin and thus facilitates the placing of the storage bin at one side of the perforator transmitter. However, the curved corrugated guide members shown are not in any case to be construed as a limitation of the invention. It is to be understood that this invention is applicable to any apparatus wherein it is desired to feed and store a tape, and in the case where the position of the storage bin with reference to the apparatus is unimportant, it is contemplated that straight corrugated guide members will be employed.

It is further to be understood that this invention is not to be limited to the feeding and storing of a perforated tape, but is equally applicable to the feeding and storing of any flexible web.

Various other changes and modifications may be made in the structure embodied in the present invention without departing from the spirit and scope thereof.

What is claimed is:

1. In a tape feeding and storing apparatus, a tape storage bin, a stationary corrugated guide member, a movable corrugated guide member having longitudinal slots therein, a plurality of rotary eccentrics for imparting circular motion to said movable corrugated guide member, said corrugated guide members cooperating to guide and advance a tape into the storage bin, whereby the tape is engaged by the movable corrugated guide member during the forward movement thereof, and a plurality of stationary members protruding through said longitudinal slots during the backward movement of said movable corrugated guide member to prevent the tape from adhering to said movable corrugated guide member during the backward movement thereof.

2. In combination in a tape feeding and storage apparatus, a tape storage bin, a pair of guide members for guiding said tape within the storage bin, one of said guide members being stationarily mounted within the bin, the other of said guide members being movably mounted within the bin, said other of said guide members having longitudinal slots therein, means mounted within the bin for imparting circular motion to said movably mounted guide member, friction pads on the movably mounted guide member to frictionally engage the tape to intermittently advance it between said guide members during the forward movement of said movably mounted guide member, a stationary member mounted within the tape storage bin, said stationary member adapted to protrude through said longitudinal slots to engage the tape during the backward movement of said movably mounted guide member to prevent the tape from adhering to the friction pads during the backward movement of the movably mounted guide member, and a tape deflecting member mounted within the storage bin for preventing the tape from being forced down along one side of the tape storage bin.

3. In combination in a tape feeding and storing apparatus, a tape storage bin, a pair of corrugated guide members for advancing and guiding said tape, one of said corrugated guide members being stationarily mounted within the bin, the other of said corrugated guide members being movably mounted within the bin, a pair of rotary eccentrics for imparting circular motion to the movably mounted corrugated guide member, rubber pads mounted on portions of the movably mounted corrugated guide member to frictionally engage the tape to advance it between the corrugated guide members during the forward movement of the movably mounted corrugated guide member, said movably mounted corrugated guide member having longitudinal slots therein, stationary members protruding through said longitudinal slots during the backward movement of the movably mounted corrugated guide member to positively prevent the tape from adhering to the rubber pads on the movably mounted corrugated guide member during the backward movement thereof, and an inwardly bowed deflecting member mounted on the side of the bin adjacent one end of the stationarily mounted corrugated guide member for preventing the tape from being forced down along the side of the storage bin.

4. In a device for advancing a tape into a storage bin, a stationary corrugated tape guiding member, a movable corrugated tape guiding member complementary to said stationary corrugated member, said corrugated members cooperating to direct a tape into said storage bin, means for imparting a circular movement to said movable corrugated member, said corrugated members being positioned with the concave portions of one substantially opposite the convex portions of the other, friction members on the convex portions of said movable corrugated member, said circular movement imparting means being effective to move said movable corrugated member forward and backward, the convex portions of said stationary corrugated member being effective to retain said tape in a position to be engaged by said friction members on said movable corrugated member during the forward movement thereof to thereby advance said tape, said movable corrugated member having longitudinal slots therein, stationary members protruding through said slots during the backward movement of said movable corrugated member to positively disengage said tape from said friction members to prevent recession of said tape during backward movement of said movable corrugated member, and an inwardly bowed deflecting member for preventing said tape from being forced along a side of said storage bin while being advanced thereinto by said movable corrugated member.

5. In a device for advancing a tape into a storage bin, a stationary corrugated tape guiding member, a movable corrugated tape guiding member complementary to said stationary corrugated member, said corrugated members cooperating to direct a tape into said storage bin, means for imparting a circular movement to said movable corrugated member, said corrugated members being positioned with the concave portions of one substantially opposite the convex portions of the other, friction members on the convex portions of said movable corrugated member, said circular movement imparting means being effective to move said movable corrugated member forward and backward, the convex portions of said stationary corrugated member being effective to retain said tape in a position to be engaged by said friction members on said movable corrugated member during the forward movement thereof to thereby advance said tape, said movable corrugated member having longitudinal slots therein, stationary members protruding through said slots during the backward movement of said movable corrugated member to positively disengage said tape from said friction members to prevent recession of said tape during backward movement of said movable corrugated member.

WALTER J. ZENNER.

REFERENCES CITED

The following references are of record in the file of this patent:

UNITED STATES PATENTS

| Number | Name | Date |
|---|---|---|
| 180,089 | House | July 25, 1876 |
| 1,513,106 | Gruman | Oct. 28, 1924 |
| 1,627,905 | Jensen | May 10, 1927 |
| 1,750,357 | Ramdor | Mar. 11, 1930 |
| 1,946,874 | Nicholas | Feb. 13, 1934 |
| 2,331,947 | Wack | Oct. 19, 1943 |
| 2,348,355 | Miller | May 9, 1944 |